United States Patent [19]

Smalley et al.

[11] 3,859,212

[45] Jan. 7, 1975

[54] FLOCCULATING AGENTS

[75] Inventors: Graham Smalley, Huddersfield; George McGrow, Mirfield; Dennis Crowley, Leeds, all of England

[73] Assignee: Allied Colloids Manufacturing Company Limited, Yorkshire, England

[22] Filed: Oct. 6, 1972

[21] Appl. No.: 295,754

[30] Foreign Application Priority Data
Oct. 12, 1971 Great Britain.................... 47487/71

[52] U.S. Cl.................. 210/54, 260/72 R, 423/616
[51] Int. Cl............................................. B01d 21/01
[58] Field of Search .............................. 210/52–54; 260/72 R; 423/616

[56] References Cited
UNITED STATES PATENTS
3,171,805  3/1965  Suen et al. .............................210/54

3,719,748  3/1973  Manfroy et al. ...................... 210/54

FOREIGN PATENTS OR APPLICATIONS
768,598  2/1954  Great Britain .................... 260/72 R Primary Examiner—Samih N. Zaharna
Assistant Examiner—Peter A. Hruskoci
Attorney, Agent, or Firm—E. J. Berry

[57] ABSTRACT

Novel high molecular weight water soluble polymers containing methylolacrylamide and aminomethylacrylamide units and process for their preparation by reaction of an amine and formaldehyde with an acrylamide polymer. The polymers are superior flocculating agents especially for use with suspensions of high acid and/or ionic content and, in the form of their quaternary ammonium salts, the polymers have excellent stability.

13 Claims, No Drawings

FLOCCULATING AGENTS

It is well known to use flocculants to assist in the wet extraction of mineral substances from ores in effluent treatments and in similar processes involving aqueous suspensions. The flocculants are used to increase the state of aggregation of suspended solid particles and thereby to facilitate separation of solid from liquid constituents by processes such as sedimentation, filtration and flotation.

Many flocculants are known and include natural products such as gums, starches and glues and synthetic polymers, especially high molecular weight polyelectrolytes.

Suspensions of solids having very low pH values, and especially suspensions having also high ionic contents, are often difficult to flocculate. Typical of such suspensions are suspensions of inorganic pigments or salts or other compounds in strong mineral acids such as sulphuric, hydrochloric or phosphoric acid. Such suspensions may also be formed during processes involving the use of strong acids for the recovery of valuable metals which are to be used as catalysts. Also, such suspensions are formed during mineral extraction processes in which ores are leached with strong acids and the desired constituents are dissolved in the acid, leaving insoluble impurities as a suspension in the acid. We find that in many such processes many commercially available flocculating agents are either inactive or perform at low efficiency and therefore at high cost.

However some flocculants are available for such purposes. Thus in our British Patent specification No. 1,227,743 there is described the use of high molecular weight copolymers of cationic esters of acrylic acids for the clarification of acidic titanium sulphate liquors derived from the acid leaching of titaniferous ores and slags, wherein the cationic ester monomers can be advantageously copolymerised with other water soluble monomers or mixtures of water soluble monomers, provided that the units from the latter are present in the final polymer to the extent of no more than 40% by weight based on the total polymer weight. Examples of the use of suitable comonomers such as acrylamide, methylol acrylamide and acrylic acid are given.

Also, in South African Patent specification No. 707,068, there is described for the clarification of such titanium sulphate liquors the use of polymers containing monomer units having the formula:

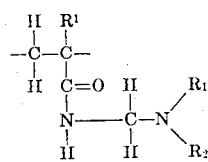

wherein $R^1$ is hydrogen or methyl, and $R_1$ and $R_2$ are alkyl groups, for example, methyl or ethyl groups, and preferably contain not more than 4 or 5 carbon atoms. Such polymers are obtained by reacting a polyacrylamide with a secondary amine and formaldehyde and it is stated that best results are obtained when the reaction is carried out to give substantially 100% conversion of the acrylamide groups. It is also stated that although a proportion of the acrylamide groups may be hydrolysed the best results are obtained when none of the acrylamide groups is hydrolysed.

It has been our purpose to device improved cationic flocculating agents, processes for making them and processes of flocculation using them, and in particular such agents and flocculation processes that are particularly applicable in systems involving strongly acidic liquors with high ion content.

The flocculating agents of this invention are high molecular weight water soluble copolymers containing within the molecular chain methylolacrylamide units (A):

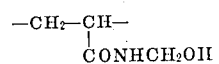

and aminomethyl acrylamide units (B):

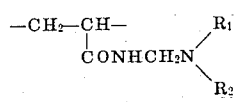

in which $R_1$ is hydrogen or a substituent and $R_2$ is a substituent or $R_1$ and $R_2$, together with the nitrogen atom to which they are attached, complete a heterocycle, the molar ratio A:B being from 3:1 to 1:2.3, often from 2:1 to 1:2, and, optionally, up to 16 mole percent of acrylamide units (C):

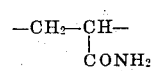

based on the total of A+B+C and, optionally, up to 55 mole percent of acrylate units (D):

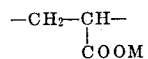

in which M is hydrogen or a basic cation or radical such as sodium, potassium, ammonium or substituted ammonium.

Additionally, other monomer units may be present in the copolymer, as explained below.

In the aminomethylacrylamide units (B) the amino moiety may, as indicated by the formula as defined above, be secondary or tertiary. Thus, either $R_1$ is hydrogen and $R_2$ is a substituent or both are substituents which may be the same or different. Suitable substituents include, for example, lower alkyl and lower hydroxyalkyl. As already indicated, $R_1$ and $R_2$ together with the nitrogen atom to which they are attached may complete a heterocycle. For example, $R_1$ and $R_2$ taken together may represent $-(CH_2)_5-$, $-CH_2 CH_2 O CH_2 CH_2-$ or $-CH_2 CH_2 NH CH_2 CH_2-$. Any lower alkyl groups present preferably contain 1 to 4 carbon atoms and any lower hydroxyalkyl groups preferably contain 2 to 4 carbon atoms.

The polymers may be in the form of water soluble salts of the cationically active groups (B), for example they may be formulated as hydrochloride salts or hydroacetate salts or as quaternary ammonium salts. The quaternary ammonium salts have much enhanced stabilities particularly at elevated temperatures.

If C and D are substantially absent, as is preferred from the point of view of flocculating activity, so that the copolymer comprises A and B alone, optionallly with non-interfering groups, the ratio of A:B is preferably from 3:1 to 1:1, most preferably from 2:1 to 1.5:1. If C is present but D is absent the ratio of A:B is preferably 2:1 to 1.2:1, most preferably 1.8:1 to 1.5:1. Best results are usually obtained at a ratio of 1.6:1 to 1.5:1. The amount of C, as a mol percentage based on A+B+C, is preferably as low as possible in order to obtain optimum activity, usually this amount is from 0 to 8%.

If both C and D are present then the ratio A:B is preferably 1:1 to 1:2.3, and most preferably 1:1.2 to 1:2. In this case the amount of C is preferably from 0 to 10 mol percent, based on A+B+C, most preferably from 0 to 5%. The amount of D is preferably as low as possible in order to obtain optimum activity, usually this amount is from 0 to 30%.

When both C and D are present the optimum amount of C depends upon the amount of D that is present. If D is present in large quantities, for example 40 to 55 mol percent, it is particularly desirable that the amount of C should be less than 10 mol percent while if D is present in rather smaller quantities the presence of rather larger amounts of C than 10% may be tolerated without unduly detracting from the properties of the copolymer.

By way of further explanation, in the polymers where C and D are absent there is, based on the total of A+B, preferably 50 to 75 mol percent of A and 50 to 25 mol percent of B. If C is also present in a significant amount e.g. 2 mol percent or more of the total of A+B+C, there is, based on the total of A+B, preferably 54.5 to 66.6 mol percent of A and 45.5 to 33.3 mol percent of B. If a significant amount of D is present as well as C, there is, based on the total of A+B, preferably 30 to 50 mol percent of A and 70 to 50 mol percent of B.

The copolymers may contain other monomeric units in addition to the four classes of units defined above. The total amount of such other units is usually not more than 25% by weight. Such units must not adversely affect the solubility of the polymer for the purpose for which it is intended. The inclusion of such units may have the advantage of lowering the cost of the polymer. When water insoluble monomers, such as acrylonitrile, styrene, vinyl acetate, and dialkyl maleate, are introduced their total amount should usually be less than about 12% by weight. When water soluble monomers are introduced, such as hydroxyethyl acrylate, methacrylamide and quaternised diethylaminoethyl acrylate, rather larger amounts may be tolerated. If more than about 25% of such other monomers are included they may dilute the active constituents of the polymer to a greater extent than is acceptable.

In order that the copolymers should have good flocculating properties they must be water soluble and must also have high molecular weights. For example the intrinsic viscosity is preferably greater than 3, most preferably greater than 11. Expressed another way, the molecular weight is preferably greater than 1,000,000, most preferably greater than 5,000,000.

The polymers may conveniently be obtained by reaction of certain acrylamide polymers of suitably high molecular weight with an amine and formaldehyde. The amine used determines the nature of the units B in the polymers produced whilst the relative proportions of amine and formaldehyde which react influence the ratio A:B in the polymers. The extent to which the reaction is carried out influences the proportion of units A and B in the polymer. The starting polymer used may be an acrylamide homopolymer or copolymer e.g., one containing acrylate units B and may be prepared by conventional methods e.g. homopolymerisation of acrylamide or polymerisation of acrylamide with sodium acrylate. The formation of the starting polymer is normally carried out in the presence of a free radical catalyst. In the reaction of the starting polymer with the amine and formaldehyde the amount of amine used is generally less than the stoichiometric amount required for reacting with the acrylamide groups whilst the amount of formaldehyde used is generally greater than the stoichiometric amount required for reacting with the acrylamide groups.

An alternative method by which the polymers may be made involves methylolating, by use of formaldehyde, certain of the aminomethylated polymers described in South African Patent specification No. 707,068. In this case the starting aminomethylated polymers must be of suitably high molecular weight and must contain a suitable proportion of acrylamide units so that these can be methylolated to a sufficient extent to give products having the required A:B ratio.

The new flocculating agents are of value in treating suspensions of solids of various types and may be utilised by mixing them into a suspension prior to separation of the solids of the suspension from the liquid medium. They are, however, of particular value for the flocculation of acidic suspensions, for example the flocculation of titanium sulphate liquors, such as are conventionally obtained in the extraction of titanium from ilmenite. These liquors are commonly termed "black liquors".

When the proportions of the various units in the copolymers are maintained within the figures quoted above the polymers are found to be extremely effective while if the proportions fall outside the figures quoted above the polymers are either wholly ineffective or, at least, are considerably less effective.

The following are some examples. Examples 1 and 3 are comparative examples showing the formation of polymers that are within the general disclosure of South African Patent specification No. 707,068 but which are outside the present invention, while Examples 2 and 4 demonstrate the formation of polymers according to the invention. Examples 5 and 6 demonstrate the use of the polymers obtained in Examples 1 to 4. Examples 7 to 10 and 12 to 15 are further examples of the formation of polymers according to the invention and Examples 11, 12 and 16 further illustrate the use of polymers according to the invention.

EXAMPLE 1

A polymer of acrylamide having a viscosity average molecular weight of approximately 8 million was dissolved in water to give a 2% solution. This solution was heated for 4 hours at 50°C with dimethylamine and formaldehyde, both these ingredients being present to the extent of 1 mol per mol of amide units present.

The product, labelled Compound A, contained with respect to the original acrylamide units present, 65 mol % dimethylaminomethylacrylamide units, 19 mol % methylolacrylamide and 16 mol % of acrylamide units.

EXAMPLE 2

A 2% solution of the polymer as used in the preparation of compound A was heated for 4 hours at 50°C with dimethylamine and formaldehyde, these ingredients being present to the extent of 0.5 and 1.5 moles respectively per mole of amide group.

The product, labelled compound B, contained with respect to the original acrylamide units present, 41 mol % dimethylaminomethylacrylamide units, 46 mol % methylolacrylamide units and 13 mol % of acrylamide units.

EXAMPLE 3

A 2% solution of a copolymer of acrylamide and sodium acrylate in which the proportion of the acrylate groups in the final polymer was 34 mol %, and the viscosity average molecular weight of the polymer was approximately 5 million, was heated at 65°C for 5 hours with dimethylamine and formaldehyde, both these ingredients being present to the extent of 0.75 moles per mol of amide group present in the polymer.

The product, labelled compound C, contained 39.3 mol % of dimethylaminomethylacrylamide units, 2.6 mol % of methylolacrylamide units, 24.7 mol % of acrylamide units and 33.4 mol % of sodium acrylate units.

EXAMPLE 4

A 2% solution of the polymer as used in the preparation of compound C was heated at 65°C for 5 hours with dimethylamine and formaldehyde, these reactants being present to the extent of 0.75 and 1.5 moles respectively per mol of amide group present in the polymer.

The product, labelled compound D, contained 34.6 mol% of dimethylaminomethylacrylamide units, 28.6 mol % of methylolacrylamide units, 3.4 mol % of acrylamide units and 33.4 mol % of sodium acrylate units.

EXAMPLE 5

A sample of black liquor was prepared in the laboratory, by mixing sulphated ilmenite ore with an equal weight of water and heating the mixture with stirring for 6 hours at 65°C. The density of the resulting suspension was then adjusted to 112° TW by addition of water and the mixture reduced by addition of iron filings until no ferric iron reaction towards ammonium thiocyanate was given by a diluted sample. The black liquor prepared in this manner was typical of that produced in plant practice and was regarded from the results obtained below as being of normal quality that is to say moderately easy to clarify by addition of flocculants.

To carry out the clarification test 500 ml quantities of the liquor were placed in graduated beakers, and whilst the contents were stirred at 300 revolutions per minute, aqueous solutions of the flocculants to be tested were introduced into the liquors at a concentration of 0.1%. The dosage rate of the flocculants was equivalent to 24 milligrams active flocculant per litre of liquor for compounds A, B, C and D and 40 milligrams active flocculant per litre for compounds E and F (see below).

Stirring was stopped 1 minute after addition of the flocculants solids allowed to settle. The settling abilities of the flocculants were compared by comparing the volumes of clear supernatant liquid after 10, 20 and 30 minutes settling. Additionally, the clarities produced were compared by filtering a 50 ml aliquot of the supernatant liquor after 30 minutes settling, through a glass fibre filter mat, and subsequently determining the weight of residual matter collected thereon.

On this test a percentage of clear supernatant liquor exceeding 70% after 30 minutes settling is regarded as indicative of a satifactory settling rate and a residual suspended solids figure of 0.5 gms per litre or less, as a satisfactory clarity figure.

The products tested were compounds A, B, C and D described above, a high molecular weight copolymer of acrylamide and diethylaminoethyl acrylate (compound E) and a polyamine-polyamide epichlorhydrin resin (compound F). Compounds E and F are as described in British Patent specification No. 1,227,743, and are used in the industry for the purpose of settling the insoluble constituents of titanium sulphate liquor.

The results obtained are given in Table I.

TABLE I

| Cmpd. | Supernatant volume % versus time | | | Supernatant Residual Solids (gms. per litre) |
|---|---|---|---|---|
|  | 10 mins. | 20 mins. | 30 mins. |  |
| A | No clear liquor obtained | | | >5 |
| B | 65 | 73 | 80 | 0.03 |
| C | None | 65 | 67 | 4.8 |
| D | 69 | 75 | 75 | 0.3 |
| E | 53 | 68 | 75 | 0.7 |
| F | None | 55 | 58 | 0.2 |

From these results it can be seen that the compounds of the invention give excellent settlement rates and clarification while compounds E and F give somewhat inferior results and compounds A and C give very inferior results, and in fact give results which are totally unacceptable.

EXAMPLE 6

Black liquor was prepared exactly as described for Example 5 except that after reduction it was heated for 2 hours at 80°C. This treatment is said to induce a low degree of hydrolysis of the titanium sulphate with the production of a small proportion of colloidal hydrated titanium dioxide. Conditions similar to this are encountered from time to time in the large scale manufacture of titanium dioxide and such liquors are notoriously difficult to clarify and settle. Flocculation tests were carried out exactly as in Example 5, but additionally using the reagents at dose levels of 45 mg/l for compounds A, B, C and D and 75 milligrams per litre for compounds E and F. The results are given in Table 2.

Table 2

| Product | Dose gm/litre | Supernatant volume % versus time | | | Supernatant Residual Solids gm/litre |
|---|---|---|---|---|---|
|  |  | 10 min. | 20 min. | 30 min. |  |
| A | 24 | No clear liquor obtained | | | >5 |
| B | 24 | None | 58 | 68 | 0.9 |
| C | 24 | No clear liquor obtained | | | >5 |
| D | 24 | None | 60 | 69 | 0.8 |
| E | 40 | No clear liquor obtained | | | >5 |
| F | 40 | No clear liquor obtained | | | >5 |
| A | 45 | None | 52 | 58 | >2 |
| B | 45 | 55 | 69 | 77 | 0.2 |
| C | 45 | None | 53 | 61 | 1.5 |
| D | 45 | None | 63 | 78 | 0.15 |
| E | 75 | None | None | 63 | >2 |
| F | 75 | None | 48 | 58 | 0.8 |

From these results it can be seen that on this difficult liquor all the products are less efficient at the lower dosage levels but that the compounds of the invention give the best results. At the dosage level of 45 mg/l the compounds of the invention, B and D, give acceptable results, whereas compound F at 75 mg/l is inferior and compounds A and C at 45 mg/l and compound E at 75 mg/l are very much inferior and unacceptable.

EXAMPLE 7

A 2% solution of a copolymer of acrylamide and sodium acrylate, in which the proportion of the acrylate groups in the polymer was 8 mol percent and the viscosity average molecular weight of the polymer was approximately seven million, was allowed to react as in Example 4, but with 0.75 mol dimethylamine and 1.5 mols formaldehyde per mol of amide group present in the polymer.

The product, labelled Compound G, contained 49.8 mol percent dimethylaminomethylacrylamide units, 42.4 mol percent methylolacrylamide units and 8 mol percent sodium acrylate units.

EXAMPLE 8

A 2% solution of the polymer as used in the preparation of Compound A was heated for 4 hours at 50° with 0.4 mol dimethylamine and 1.5 mols formaldehyde per mol of amide group.

The product, labelled Compound H, contained 33 mol percent dimethylaminomethylacrylamide units and 67 mol percent methylolacrylamide units.

EXAMPLE 9

A 2% solution of a copolymer of acrylamide and methacrylamide containing 4 mol percent methacrylamide, and having a viscosity average molecular weight of 3 million was allowed to react at room temperature for 24 hours with 1.5 mols formaldehyde and 0.75 mols dimethylamine per mol of amide group present in the polymer.

The product, labelled Compound I, contained 56.5 mol percent dimethylaminomethylacrylamide units, 35.5 mol percent methylolacrylamide units, and 8 mol percent free amide units.

EXAMPLE 10

A 2% solution of a copolymer of acrylamide and acrylonitrile containing 6.6 mol percent acrylonitrile, and having a viscosity average molecular weight of 3 million, was allowed to react at room temperature for 24 hours with 1.5 mols formaldehyde and 0.75 mols dimethylamine per mol of amide group present in the polymer.

The product, labelled Compound J, contained 52 mol percent dimethylaminomethylacrylamide units, 41.4 mol percent methylolacrylamide units and 6.6 mol percent acrylonitrile units.

EXAMPLE 11

Compounds G, H, I and J, were tested in the manner described in Example 5, at a dose level of 24 mgm/l, and the results are given in Table 3.

Table 3

| Product | Supernatant volume % versus time. | | | Supernatant Residual solids (grams per litre) |
|---|---|---|---|---|
| | 10 Mins. | 20 Mins. | 30 Mins. | |
| Compound G | 68 | 73 | 75 | 0.26 |
| Compound H | 69 | 71 | 72 | 0.21 |
| Compound I | 83 | 84 | 85 | 0.05 |
| Compound J | 84 | 85 | 85 | 0.06 |

Compounds G and H, and Compounds I and J were tested on black liquor prepared from different samples of ilmenite ore.

EXAMPLE 12

Copolymer containing 66 mol percent acrylamide and 34 mol percent sodium acrylate, as used in Examples 3 and 4, was reacted as previously described, with various proportions of dimethylamine and formaldehyde, and the products were tested in the manner described in Example 5 at 24 mgm/l.

The results obtained are given in Table 4.

When polymers according to the invention are made by reaction of an acrylamide polymer with an amine and formaldehyde it is generally preferred that the reaction should be so carried out that only 10 mol % or less of the original acrylamide units remain and that 50 to 70 mol % of the converted units are aminomethylated acrylamide units whilst 30 to 50 mol % of the converted units are methylolacrylamide units. It can be seen from Table 4 that much the best product, product 4, lies in this preferred region. Some of the other products lie in less preferred regions whilst the least satisfactory products are outside the scope of the invention.

Table 4

| Product | Moles CH$_2$O per mol amide | Moles (CH$_3$)$_2$NH per mole amide | Conversion of amide mole percent | | | Supernatant volume % versus time | | | Supernatant Residual Solids (grams per litre) |
|---|---|---|---|---|---|---|---|---|---|
| | | | A. | B. | C. | 10 Mins | 20 Mins | 30 Mins | |
| 1 | 1.5 | 1.5 | 22 | 78 | 0 | 43 | 59 | 65 | 0.720 |
| 2 | 1.5 | 1.0 | 29 | 71 | 0 | 56 | 67 | 69 | 0.638 |
| 3 | 1.0 | 1.0 | 6 | 72 | 22 | 48 | 64 | 68 | 0.716 |
| 4 | 1.5 | 0.75 | 43 | 52 | 5 | 70 | 75 | 75 | 0.292 |
| 5 | 1.0 | 0.75 | 22 | 58 | 20 | 59 | 67 | 70 | 1.0 |
| 6 | 0.75 | 0.75 | 4 | 59 | 37 | None | 65 | 67 | 4.8 |
| 7 | 1.5 | 0.5 | 53 | 32 | 15 | 70 | 75 | 77 | 0.842 |
| 8 | 1.0 | 0.5 | 31 | 40 | 29 | 68 | 75 | 77 | 1.0 |
| 9 | 0.75 | 0.5 | 19 | 42 | 39 | 62 | 70 | 76 | 2.62 |

A = Methylolacrylamide
B = Dimethylaminomethylacrylamide
C = Acrylamide.

EXAMPLE 13

Sodium acetate (3.0 g) and 4.7 g dimethylsulphate were added to 150 g solution as prepared in Example 7 (Compound G) and the quaternised product was labelled Compound K. Samples of Compounds G and K were stored in an incubator at 40°C and their viscosities were measured at intervals using a Brookfield RVT viscometer with Spindle 6 at 10 r.p.m. The results are given in Table 5.

Table 5

| Days at 40° | Viscosities (Cps) | |
| --- | --- | --- |
| | Compound G. | Compound K. |
| 0 | 5,000 | 5,000 |
| 11 | 20,000 | 5,000 |
| 15 | Crosslinked | 5,000 |
| 42 | Crosslinked | 8,000 |
| 51 | Crosslinked | 8,000 |
| 72 | Crosslinked | 8,000 |

Compound K after prolonged storage at 40°C, still maintained its high level of activity on Black Liquor clarification when tested as in Example 5 at a dose level of 24 mgm/l as indicated in Table 6.

Table 6

| Compound K (Days at 40°) | Supernatant volume % versus time. | | | Supernatant Residual Solids g/l |
| --- | --- | --- | --- | --- |
| | 10Mins. | 20Mins. | 30Mins. | |
| 0 | 84.5 | 84.5 | 86 | 0.22 |
| 72 | 83.3 | 86 | 86 | 0.21 |

EXAMPLE 14

The procedure of Example 7 was repeated except that diethylamine was used in place of dimethylamine. The product, labelled Compound L, contained 50 mol percent diethylaminomethylacrylamide units, 38 mol percent methylolacrylamide units, 4 mol percent acrylamide units and 8 mole percent sodium acrylate units.

EXAMPLE 15

The procedure of Example 7 was repeated except that diethanolamine was used in place of dimethylamine, and the reaction was buffered to pH 10.5 with trisodium phosphate. The product, labelled Compound M, contained 45 mol percent diethanolaminomethylacrylamide units, 47 mol percent methylolacrylamide units and 8 mol percent sodium acrylate units.

EXAMPLE 16

Compounds L and M were tested in the manner described in Example 5 at a dose level of 40 mgm/l, and the results are given in Table 7.

Table 7

| Product | Supernatant volume % versus time. | | | Supernatant Residual solids (grams per litre) |
| --- | --- | --- | --- | --- |
| | 10Mins. | 20Mins. | 30Mins. | |
| Compound L | 73 | 77 | 80 | 0.15 |
| Compound M | 69 | 75 | 77 | 0.23 |

We claim:

1. A process for separating solids of an acidic suspension of solids in a liquid medium from the liquid medium by means of sedimentation, filtration or flotation, which comprises contacting said suspension with a water soluble copolymer having a molecular weight greater than 5,000,000 and active ingredients consisting essentially of methylolacrylamide units (A):

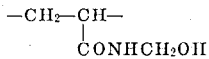

and aminomethylacrylamide units (B):

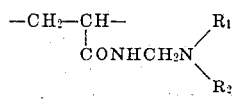

in which $R_1$ and $R_2$ which are $C_{1-4}$ alkyl and $C_{2-4}$ hydroxyalkyl, the molar ratio A:B being from 2:1 to 1:2.3.

2. A process according to claim 1 in which the polymer has a molar ratio of A:B of from 2:1 to 1:2.

3. A process according to claim 2 in which the molar ratio A:B is from 2:1 to 1.5:1 in the copolymer.

4. A process according to claim 1 in which the polymer is a quaternary ammonium salt of the aminomethylacrylamide units (B).

5. A process according to claim 4 in which the molar ratio A:B in the polymer salt is from 2:1 to 1:2.

6. A process according to claim 1 in which the suspension is black liquor obtained in extraction of titanium from ilmenite.

7. A process according to claim 1 wherein $R_1$ and $R_2$ of the copolymer are methyl.

8. A process according to claim 1 wherein the copolymer contains up to 16 mol percent of acrylamide units (C):

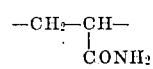

based on the total of A+B+C, and in which the molar ratio A:B is from 2:1 to 1.2:1 in the copolymer.

9. A process according to claim 8 wherein the copolymer contains up to 12% by weight of monomeric units selected from the group consisting of acrylonitrile, styrene, vinyl acetate, dialkyl maleate, hydroxyethyl acrylate, methacrylamide and quaternized diethylaminoethyl acrylate.

10. A process according to claim 1 wherein the copolymer contains 0 to 16 mol percent of acrylamide units (C):

and up to 33.4 mol percent of acrylate units (D):

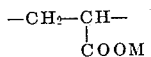

in which M is hydrogen or a basic cation, and in which the molar ratio A:B is from 1:1 to 1:2.3 in the copolymer.

11. A process according to claim 10 in which the molar ratio A:B is from 1:1.2 to 1:2 in the copolymer.

12. A process according to claim 10 wherein the copolymer contains up to 12 % by weight of monomeric units selected from the group consisting of acrylonitrile, styrene, vinyl acetate, dialkyl maleate, hydroxyethyl acrylate, methacrylamide and quaternized diethylaminoethyl acrylate.

13. A process according to claim 1 wherein the copolymer contains up to 12% by weight of monomeric units selected from the group consisting of acrylonitrile, styrene, vinyl acetate, dialkyl maleate, hydroxyethyl acrylate, methacrylamide and quaternized diethylaminoethyl acrylate.

* * * * *